United States Patent [19]

Gaiser et al.

[11] 4,342,240
[45] Aug. 3, 1982

[54] METHOD AND APPARATUS FOR FEEDING ROD-LIKE WORKPIECES TO A SEVERING MACHINE

[75] Inventors: Ruprecht Gaiser, Baden-Baden; Paul Stolzer, Achern, both of Fed. Rep. of Germany

[73] Assignee: Keuro Maschinenbau Gesellschaft mit beschränkter Haftung & Co. Kommanditgesellschaft, Achern, Fed. Rep. of Germany

[21] Appl. No.: 148,174

[22] Filed: May 8, 1980

[30] Foreign Application Priority Data

May 25, 1979 [DE] Fed. Rep. of Germany ....... 2921194

[51] Int. Cl.³ .............................................. B23D 51/04
[52] U.S. Cl. .......................................... 83/42; 83/153; 83/277; 83/282; 226/150
[58] Field of Search .................... 83/42, 277, 153, 282; 226/149, 150

[56] References Cited

U.S. PATENT DOCUMENTS

| | | | |
|---|---|---|---|
| 3,123,270 | 3/1964 | Olson | 226/150 X |
| 3,182,538 | 5/1965 | Whitmore et al. | 226/150 X |
| 3,707,103 | 12/1972 | Tishken | 83/277 X |
| 4,080,858 | 3/1978 | Stolzer | 83/277 X |
| 4,182,206 | 1/1980 | Millar et al. | 83/277 X |
| 4,252,040 | 2/1981 | Kiefer | 83/277 X |

*Primary Examiner*—Frank T. Yost
*Attorney, Agent, or Firm*—Spencer & Kaye

[57] ABSTRACT

A method and apparatus for periodically feeding a rod-like workpiece into a severing machine for severing predetermined lengths in a cutting plane during cutting steps alternating with feeding steps. There are provided openable and closable clamping jaws for grasping the workpiece adjacent the cutting plane during each cutting step and openable and closable feed jaws for grasping the workpiece at a predetermined distance upstream of the cutting plane as viewed in the direction of feed and advancing the workpiece through the cutting plane by a distance corresponding to the desired length to be cut. The feed jaws are, subsequent to the feeding step and the closing of the clamping jaws, but prior to the completion of the cutting step, opened and moved away from the cutting plane by an extent that corresponds to the subsequent feed stroke and are thereafter closed again to grasp the workpiece anew.

9 Claims, 4 Drawing Figures

METHOD AND APPARATUS FOR FEEDING ROD-LIKE WORKPIECES TO A SEVERING MACHINE

BACKGROUND OF THE INVENTION

This invention relates to a method and an apparatus for feeding rod-like material (hereafter "workpiece") to a severing machine, such as a frame saw, a circular cold saw, a band saw or the like. The workpiece which is supported on a machine table and on a feeding device arranged upstream of the machine table as viewed in the direction of feed, is, during the severing operation, clamped in the zone of the cutting plane between at least two jaws which may be opened and closed in a direction transverse to the direction of feed. Between two cutting steps the workpiece is advanced (fed) to the severing machine by means of at least two feed jaws (forming part of the feeding device) which can be opened and closed in a direction transverse to the direction of feed. This cyclical feeding operation which is usually automatically controlled by a preset control device, involves the difficulty in maintaining the final length portion of the workpiece (after the consecutive severing steps) as short as possible in an effort to reduce waste.

According to the prior art devices the clamping shoes are divided or have a notch in the zone of the cutting plane of the saw blade so that they grasp the workpiece at both sides of the cutting plane. The workpiece feed is effected by opening the feed jaws subsequent to a cutting step in order to execute a return motion of the feed jaws to an extent which equals the length of the next feed, while the leading end of the rod is maintained clamped by that part of the clamping jaws which are situated at the feed side (that is, at the upstream side) of the cutting plane. Then the feed jaws again grasp the workpiece and in an open position of the clamping jaws, advance the workpiece to the desired extent. Thereafter, the clamping jaws are closed and the consecutive cutting operation is started. In this arrangement the minimum remaining workpiece length is determined by that portion of the clamping jaws which lie at the upstream side of the cutting plane as well as a minimum length which is just sufficient to be still securely grasped by the feed jaws.

In order to reduce the residual length (waste length) of the workpiece, it has been known to provide the feed-side part of the clamping jaws with a recess into which the feed jaws may telescope to arrive closer to the cutting plane. Even in such an arrangement, the waste length of the workpiece is substantial and may be many times greater than the programmed length to be severed, so that waste lengths are obtained from which at least one more programmed length portion could have been severed.

SUMMARY OF THE INVENTION

It is an object of the invention to provide an improved method and apparatus for reducing the waste length of rod-like workpieces to the minimum necessary to ensure that the workpiece is still securely grasped by the feed jaws. It is a further object of the invention to modify known means without additional expense.

These objects and others to become apparent as the specification progresses, are accomplished by the invention, according to which, briefly stated, the feed jaws are, subsequent to the feeding step and the closing of the clamping jaws, but prior to the completion of the cutting step, opened and moved away from the cutting plane by an extent that corresponds to the subsequent feed stroke and are thereafter closed again to grasp the workpiece anew.

The above-outlined operational cycle of the feed jaws according to the invention thus ensures that the workpiece is already grasped by the feed jaws and is thus ready for the feeding operation before the cutting operation is terminated. It is thus no longer necessary to hold the leading end of the workpiece by the clamping jaws after execution of the cutting step while the feed jaws are executing their return motion and again grasp the workpiece.

According to a further advantageous feature of the method according to the invention, the feed jaws are opened prior to the beginning of the cutting step, then are moved away from the cutting plane by an extent that corresponds to the subsequent workpiece feed and then closed again. In this way it is ensured that during the cutting operation the workpiece is also held firmly at a location which is at a substantial distance from the cutting plane so that oscillations and/or tilting forces can have no effect.

According to a further feature of the inventive method, the workpiece end which is upstream of the cutting plane (as viewed in the direction of feed) is supported against the cutting force during the cutting operation on the side which extends in the direction of the cutting force which, in turn, is generally parallel to the machine table. This measure is particularly advantageous when very long length portions are being cut from the workpiece and consequently, the feed jaws have a significant distance from the clamping jaws during the cutting operation. Under such circumstances, towards the end of the cutting step, dependent upon the cutting forces, on the remaining terminal portion of the workpiece a transverse force may be exerted which cannot be fully counteracted by the feed jaws, so that in the absence of the above-noted additional support, the workpiece could get out of alignment.

As a result of the method according to the invention, the apparatus for performing the method can be so structured that the clamping jaws, as viewed in the direction of feed, are located exclusively downstream of the cutting plane and further, the feed jaws can be advanced up to the immediate vicinity of the cutting plane.

By virtue of the fact that the workpiece is grasped by the feed jaws as early as prior to the completion of the cutting step, it is no longer required—as noted above—that the leading end of the workpiece be still held by the clamping jaws after the cutting operation, so that the part of the clamping jaws which heretofore has been arranged at the upstream side of the cutting plane can be dispensed with. This, in turn, permits to advance the feed jaws during feed immediately up to the cutting plane, so that after the last cut from each workpiece there remains only such a minimal length (waste length) which is needed for being securely grasped by the feed jaws.

For the above-discussed support of the workpiece end at its side lying in the effective direction of the cutting force, there is provided a pivotal pawl which, in its operative position, is in alignment with that clamping jaw face which is situated on the same side of the workpiece. The pawl may be pivoted in the feeding direction away from the cross-sectional zone of the workpiece against a spring force. The pawl is shiftable as a unit with the clamping jaw which is displaceable transversely to the direction of feed. The pawl supports the rod-like workpiece particularly towards the end of the cutting step; during the feeding motions of the feed jaws, however, the pawl can be pivoted by one of the feed jaws out of the way from the cross-sectional zone of the workpiece.

DESCRIPTION OF THE PREFERRED EMBODIMENT

Figure 1:
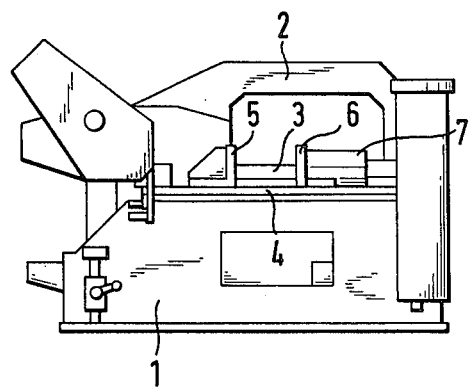
FIG. 1 is a schematic side elevational view of a frame saw according to the prior art, as viewed in the direction of the arrow I of FIG. 2.

Turning now to FIG. 1, there is shown a conventional severing machine, more particularly, a frame saw which has a machine stand 1, a saw frame 2 and a saw blade 3 held taut therein. The machine stand 1 comprises a machine table 4 on which a rod-like workpiece (not shown in FIG. 1) to be severed is clamped by means of clamping jaws 5 and 6. In the illustrated example, the clamping jaw 5 is stationarily mounted, while the clamping jaw 6 can be opened and closed by means of a power cylinder assembly 7.

Figure 2:
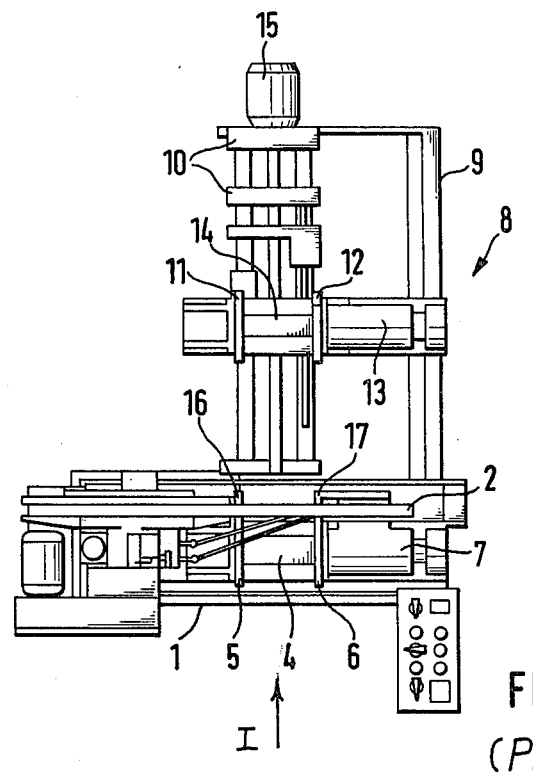
FIG. 2 is a schematic top plan view of the prior art structure shown in FIG. 1.

Turning now to FIG. 2 which illustrates the frame saw of FIG. 1 in top plan view, a conventional workpiece feeding device generally designated at 8 is arranged upstream of the frame saw, as viewed in the direction of workpiece feed. The feeding device 8 essentially comprises a stand 9 on which there are mounted rotatable rolls 10 for supporting the workpieces and a pair of feed jaws 11 and 12. Of the two feed jaws 11 and 12, the feed jaw 12 may be displaced transversely to the feed direction by a power cylinder assembly 13 for closing and opening the feed jaw pair. Between the feed jaws 11 and 12 there is provided a backup support 14 for the workpieces. The feed jaws 11, 12 are, together with the backup support 14, displaceable as a unit on the stand 9 for example, by means of a spindle drive actuated by a motor 15, towards and away from the frame saw. Thus, the feed jaws 11, 12 are displaceable parallel to the arrow I in the plane of the drawing FIG. 2.

As it may be further observed in FIG. 2, the clamping jaws 5 and 6 have respective clamp jaw parts 16 and 17 which are situated at the feed side (upstream side) of the cutting plane defined by the saw blade 3. The clamping jaw parts 16 and 17 which characterize prior-art arrangements, have the function to firmly hold the leading end of the rod-like workpiece while, after the completion of a cutting step, the feed jaws 11 and 12 are opened and are shifted away from the saw and then are again closed in order to feed the consecutive length portion of the workpiece in the direction of the saw. The clamping jaw parts 16 and 17, however, affect the size of the waste length of the workpiece (which can no longer be further severed), inasmuch as the waste length has to be, in addition to the minimum length required for the feed jaws 11 and 12 to securely grasp the workpiece, longer by an amount corresponding to the width of the clamping jaw part 16 and 17 as measured in the direction of feed.

Figure 3:
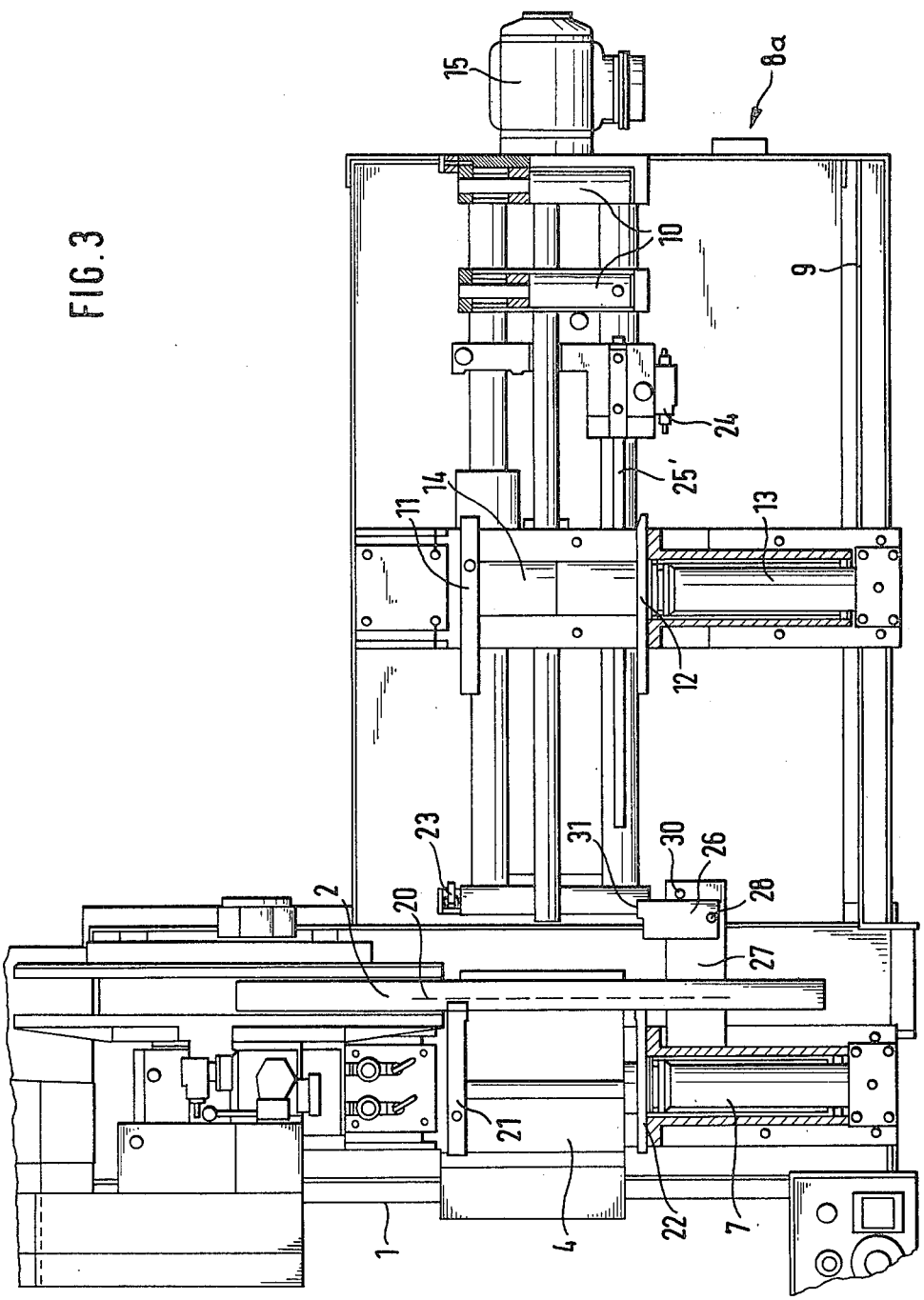
FIG. 3 is a top plan view of a preferred embodiment of the invention.

Turning now to FIG. 3, there is illustrated the severing machine and the feeding device 8a according to the invention. In FIG. 3 components that are identical to those shown in FIG. 2 are designated with the same reference numerals, but are not referred to again in the description except if they are of significance regarding structural and/or operational features of the invention.

In FIG. 3, the cutting plane 20 defined by the saw blade 3 is designated in broken lines in the zone of the saw frame 2. As seen in FIG. 3, the clamping jaws 21 and 22 are situated only on the downstream-side of the cutting plane 20 (as viewed in the direction of feed). Thus, as opposed to the prior art shown in FIG. 2, the clamping jaws do not have any parts that extend beyond the cutting plane 20 into the upstream side thereof, that is, into that side where the feeding device 8a is located. This condition permits the feed jaws 11 and 12 to be advanced to the immediate vicinity of the cutting plane 20 during workpiece feed so that the residual workpiece length (waste length) has to be only of such a size that the workpiece can still be securely gripped by the feed jaws 11 and 12 for performing the last cut on the workpiece.

The feeding device 8a has a limit switch 23 which causes stoppage of the feed motion of the feed jaws 11 and 12 at the moment when their leading edge arrives at the immediate vicinity of the cutting plane 20 at the upstream side thereof. The feeding device 8a further has another limit switch 24 which is adjustable and determines the length of the return stroke of the feed jaws 11 and 12 to thus determine the length by which the workpiece is advanced. This magnitude is settable with the aid of a fixed scale 25' along which the limit switch 24 may be shifted.

The method of feeding the workpieces according to the invention which makes possible to dispense with the clamping jaw parts 16 and 17 shown in FIG. 2 will now be discussed in conjunction with FIG. 4.

First, the rod-like workpiece 25 is brought into its illustrated position by the feed jaws 11, 12 which assume their position immediately adjacent the cutting plane 20 as shown in solid lines. During the feed, the clamping jaws 21 and 22 were open and now, in the solid-line end position of the feed jaws 11, 12 they close. Thereafter, prior to the beginning of the severing operation but not later than just prior to the completion thereof, the feed jaws 11 and 12 are opened and are displaced into the new feed position 11' and 12' (shown in broken lines) and there, again not later than prior to the completion of the cutting step, they are closed and thus grasp the workpiece. Upon completion of the cutting step, the clamping jaws 21, 22 open by virtue of the clamping jaw 22 moving transversely to the direction of feed into the phantom-line position 22' and thus the consecutive feed may take place with the aid of the feed jaws 11 and 12. Thereafter, the above-described cycle is repeated.

Figure 4:
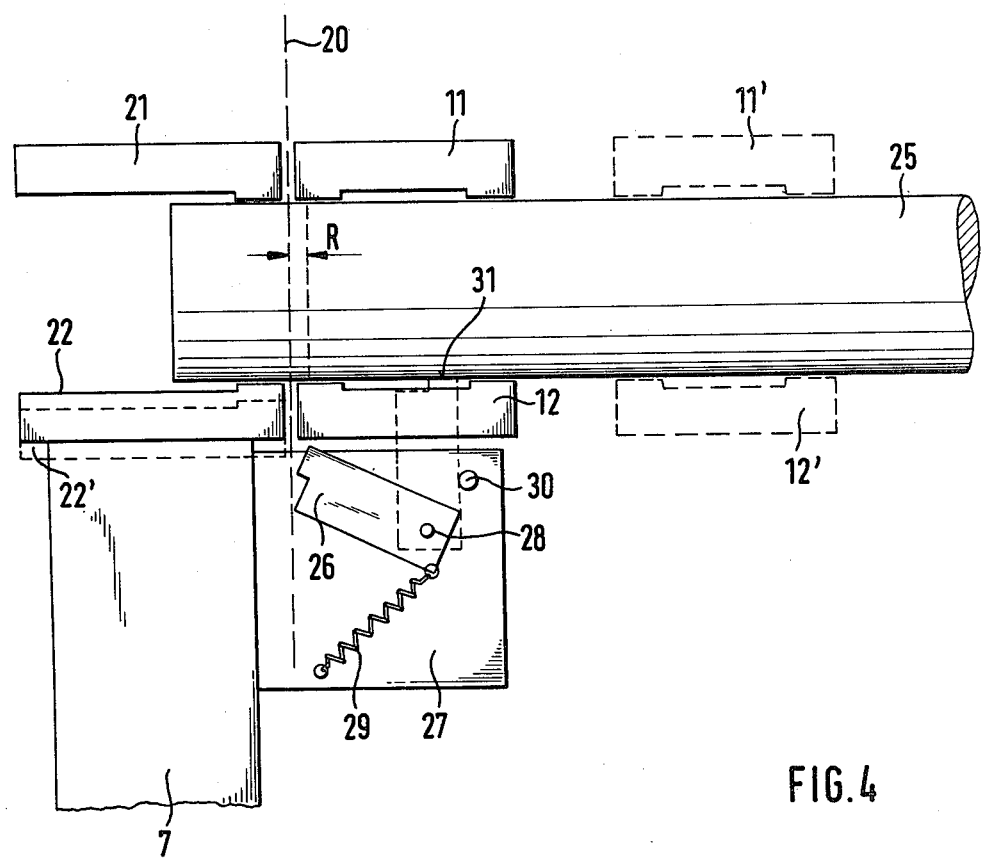
FIG. 4 is a top plan view of an enlarged detail of the structure shown in FIG. 3.

As seen in FIG. 4, the residual length (waste length) R can be very short and need not be longer than what is necessary to ensure that the last workpiece portion—from which a programmed length will still be cut—can still be securely grasped by the feed jaws 11 and 12.

In cases where, during each cycle, large workpiece lengths are to be advanced, and thus the feed jaws 11 and 12 have, precisely at the time the severing operation is completed, a substantial distance from the cutting plane 20, it is advisable to additionally support the workpiece 25 at a location close to the clamping jaws 21 and 22 at that side towards which the cutting force derived from the operation of the saw blade is directed. In case of a substantial distance of the feed jaws 11 and 12 from the cutting plane 20, the transverse force which depends from the cutting force and which is exerted on the workpiece 25 towards the end of the cutting operation, may reach such a magnitude that the feed jaws 11 and 12 are no longer capable of preventing a misalignment of the workpiece in the vicinity of the cutting plane 20. Thus, for effecting the above-noted additional support of the workpiece 25, there is provided a pawl 26 which is mounted on a component 27 by means of a pin 28 for pivotal motion about an axis perpendicular to the plane of the drawing FIG. 4. The component 27 is integral with the moving member of the power cylinder assembly 7 and thus moves in unison with the clamping jaw 22 during the opening and closing motions thereof. The pawl 26 is biased by a spring 29 which seeks to pivot the pawl 26 into its phantom-line position against a stop 30 supported on the component 27. In the phantom-line position, the leading edge 31 of the pawl 26 is coplanar with the clamping face of the clamping jaw 22.

The pawl 26 pivots, under the effect of the spring 19, automatically into the phantom-line position shown in FIG. 4 when the feed jaws 11 and 12 move back into their position 11' and 12'. When, on the other hand, the workpiece 25 is advanced, the pawl 26 is pivoted out of the way by the feed jaw 12 into the solid-line position as shown in solid lines in FIG. 4.

It is to be noted that the spring 29 is illustrated in FIG. 4 essentially in a symbolic manner. In practice, underneath the pawl 26 a torque-exerting spring or the like is arranged in order to maintain the required structural space at a minimum as it may be better observed in FIG. 3.

It is further to be understood that the disclosed pawl 26 is only a simple although expedient example for supporting the workpiece 25. This function could be achieved by a backup support operated by a separate power cylinder assembly similarly to the clamping jaw 22. Such a backup support would be moved, prior to the beginning of the cutting operation and subsequent to the return stroke of the feed jaws 11 and 12 into the positions 11' and 12', against the workpiece 25 and would then be withdrawn prior to the consecutive feed effected by the feed jaws 11 and 12.

It will be understood that the above description of the present invention is susceptible to various modifications, changes and adaptations, and the same are intended to be comprehended within the meaning and range of equivalents of the appended claims.

What is claimed is:

1. In a method of periodically feeding a rod-like workpiece into a severing machine for severing predetermined lengths in a cutting plane during cutting steps alternating with feeding steps; openable and closable clamping jaws immobilize the workpiece adjacent the cutting plane during each cutting step and openable and closable feed jaws grasp the workpiece at a predetermined distance upstream of the cutting plane as viewed in the direction of feed for advancing the workpiece through the cutting plane by a distance corresponding to the desired length to be cut; the improvement comprising the following repetitive steps;
   (a) opening the feed jaws subsequent to the feeding step and the closing of the clamping jaws and prior to the completion of the cutting step immediately succeeding said feeding step;
   (b) subsequent to step (a) and prior to the completion of said cutting step immediately succeeding said feeding step, displacing said feed jaws in an upstream direction through the distance corresponding to the length of the successive feeding step;
   (c) subsequent to step (b) and prior to the completion of said cutting step immediately succeeding said feeding step, closing said feed jaws about the workpiece for immobilizing the same; and
   (d) supporting, during each cutting step, the workpiece adjacent said cutting plane on the upstream side thereof against the effect of a cutting force generated during each cutting step.

2. A method as defined in claim 1, wherein said steps (a), (b) and (c) are performed prior to the beginning of said cutting step immediately succeeding said feeding step.

3. In a method of periodically feeding a rod-like workpiece into a severing machine for severing predetermined lengths in a cutting plane during cutting steps alternating with feeding steps; openable and closable clamping jaws immobilize the workpiece adjacent the cutting plane during each cutting step and openable and closable feed jaws grasp the workpiece at a predetermined distance upstream of the cutting plane as viewed in the direction of feed for advancing the workpiece through the cutting plane by a distance corresponding to the desired length to be cut; the improvement comprising the following repetitive steps:
   (a) opening the feed jaws subsequent to the feeding step and the closing of the clamping jaws and prior to the beginning of the cutting step immediately succeeding said feeding step;
   (b) subsequent to step (a) and prior to the beginning of said cutting step immediately succeeding said feeding step, displacing said feed jaws in an upstream direction through the distance corresponding to the length of the successive feeding step;
   (c) subsequent to step (b) and prior to the beginning of said cutting step immediately succeeding said feeding step, closing said feed jaws about the workpiece for immobilizing the same; and
   (d) subsequent to said cutting step and prior to the next cutting step, advancing said feed jaws with the workpiece in a downstream direction up to the immediate vicinity of said cutting plane.

4. A method as defined in claim 3, further comprising the step of supporting, during each cutting step, the workpiece adjacent said cutting plane on the upstream side thereof against the effect of a cutting force generated during each cutting step.

5. In an assembly formed of a severing machine periodically cutting predetermined lengths from a rod-like workpiece in a cutting plane and a feeding device arranged upstream of the severing machine as viewed in the direction of workpiece feed for advancing, in periodic feeding steps, the workpiece into the severing machine; said assembly including openable and closable clamping jaws arranged in the vicinity of said cutting plane for immobilizing the workpiece during each cutting step; each said clamping jaw having an engagement face for contacting the workpiece in a closed position of the clamping jaws; openable and closable feed jaws arranged for reciprocation between first and second limit positions parallel to the direction of feed for periodically advancing the workpiece through the cutting plane by a distance corresponding to the desired length to be cut; said feed jaws assuming said first limit position upon completion of each feeding step; said second limit position being located upstream of said first limit position; the improvement wherein said clamping jaws are situated in their entirety solely at the downstream side of said cutting plane as viewed in the direction of feed and wherein said first limit position of said feed jaws is situated in the immediate vicinity of said cutting plane at the upstream side thereof; the improvement further comprising a movably mounted support member situated adjacent said cutting plane on the upstream side thereof; said support member having a working face; and means for moving said support member from a withdrawn position into an operative position in which said working face of said support member is coplanar with the engagement face of one of said clamping jaws when said clamping jaws are in said closed position; said support member, when in said operative position, engaging the workpiece for supporting it against cutting forces exerted on the workpiece during the cutting steps.

6. An assembly as defined in claim 5, wherein said support member is a pivotally mounted pawl swingable into and out of said operative and withdrawn positions; further comprising a stop cooperating with said pawl for determining said operative position thereof.

7. An assembly as defined in claim 6, wherein said one of said clamping jaws is a movable clamping jaw; said pawl being shiftable with said movable clamping jaw as a unit in a direction transverse to the direction of feed.

8. An assembly as defined in claim 7, further comprising a mounting component attached to said movable clamping jaw and carrying said pawl.

9. An assembly as defined in claim 5, wherein said clamping jaws are situated in the immediate vicinity of said cutting plane.

* * * * *